Patented Sept. 23, 1952

2,611,765

UNITED STATES PATENT OFFICE 2,611,765

INTERPOLYMERS OF α-ACYLOXYACRYLO-NITRILES

Joseph B. Dickey, Rochester, N. Y., assignor to Eastman Kodak Company, Rochester, N. Y., a corporation of New Jersey No Drawing. Application August 18, 1950, Serial No. 180,298

16 Claims. (Cl. 260—85.5)

1

This invention relates to new polymeric derivatives of α-acyloxyacrylonitriles, methods for preparing these polymeric derivatives, and articles prepared therefrom.

The polymerization of α-acyloxyacrylonitriles, such as α-acetoxyacrylonitrile, alone or in the presence of other ethenoid monomers, has been mentioned previously, although no methods whereby such polymerization could be effected have been described. (U. S. Patent 2,395,930, dated March 5, 1947 and U. S. Patent 2,266,771, dated December 25, 1941.) In U. S. application Serial No. 777,376, filed October 1, 1947, now U. S. Patent 2,537,881, issued January 9, 1951, I have shown a method of mass polymerization or interpolymerization of α-acyloxyacrylonitriles, and the lactonization of the polymers produced is described.

The instant application is a continuation-in-part of Serial No. 777,376.

An object of my invention is to provide new polymers comprising α-acyloxyacrylonitriles, and in particular, α-acetoxyacrylonitrile. A further object is to provide a method for making such polymers. Still another object is to provide articles, such as films, fibers, tapes, sheets, etc., from these new interpolymers.

According to my invention, I interpolymerize an α-acyloxyacrylonitrile in the presence of a vinyl monomer selected from the group consisting of acrylonitrile, styrene, isopropenyl acetate, alkyl acrylates containing from 1 to 4 carbon atoms in the alkyl group, and alkyl α-methacrylates containing from 1 to 4 carbon atoms in the alkyl group. The interpolymers can be prepared using only one vinyl monomer in addition to the α-acyloxyacrylonitrile, or from 2 to 3 of such vinyl monomers can be employed.

The α-acyloxyacrylonitriles which I can advantageously use can be represented by the formula:

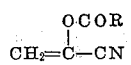

wherein R is an alkyl group, such as methyl, ethyl, n-propyl, and isopropyl (i. e. an alkyl group having the formula $C_nH_{2n+1}$ where $n$ is a positive integer from 1 to 3). Typical are α-acetoxyacrylonitrile, α-propionoxyacrylonitrile, α-n-butyroxyacrylonitrile, and α-isobutyroxyacrylonitrile.

Typical acrylates and α-methacrylates which can be used in the preparation of my new interpolymers include methyl acrylate, ethyl acrylate, n-propyl acrylate, isopropyl acrylate, n-butyl acrylate, isobutyl acrylate, secondary butyl acrylate, methyl α-methacrylate, ethyl α-methacrylate, n-propyl α-methacrylate, isopropyl α-methacrylate, n-butyl α-methacrylate, secondary butyl α-methacrylate, isobutyl α-methacrylate, etc.

Although the interpolymerization of α-acyloxyacrylonitriles with vinyl monomers, other than those set forth above, have been described in my application Serial No. 777,376, I have found that the vinyl monomers contemplated by the present application provide especially useful polymer products.

The interpolymerization is accelerated by heat or the well-known polymerization catalysts. Exemplary of such catalysts are the organic peroxides (e. g. benzoyl, acetyl, acetyl benzoyl, lauroyl, oleoyl, triacetone, urea, etc. peroxides), inorganic peroxides, such as hydrogen peroxide, perborates (e. g. sodium and potassium perborates), persulfates (e. g. sodium, potassium, and ammonium persulfates), etc. The interpolymerization can be carried out by the mass method, or by the bead or emulsion method in which water or some other medium in which the monomers are insoluble is employed as a dispersing medium, with or without emulsifying agents. The interpolymerization can also be effected in the presence of a diluent. The diluent, if employed, is advantageously a solvent for the interpolymer. The diluent need not dissolve the interpolymer, but the monomers can be dissolved in such a solvent, or a mixture of solvents, and the interpolymer precipitated therefrom as it is formed. Alternatively, the new interpolymer of my invention can be prepared according to the method described in Hagemeyer application Serial No. 180,297, filed herewith. The method described in the Hagemeyer application is especially useful in that it provides a method for obtaining products in pure form in the substantial absence of hydrolysis by-products.

The temperature at which the interpolymerization can be effected can vary from room temperature (approximately 20° C.) to the boiling point of the monomers, or of the medium in which the polymerization is effected (e. g. 100° C. for water). Advantageously, I can use a temperature of from about 40°–80° C.

Generally, I have found that the most useful interpolymers are those containing from 5 to 95 per cent by weight of α-acyloxyacrylonitrile and from 95 to 5 per cent by weight of another vinyl monomer. Interpolymers of an α-acyloxyacrylonitrile with acrylonitrile containing from 75 to 95 per cent by weight of acrylonitrile have been found to be especially useful in that they provide synthetic fibers or yarns of high tenacity and good dyeability. Interpolymers containing 75 or a larger per cent of acrylonitrile can be dissolved in solvents which are known to dissolve polyacrylonitrile, and the solutions spun into a coagulating bath to give valuable synthetic fibers. Solvents useful for this purpose include N,N - dimethylformamide, N,N - dimethylacetamide, γ-butyrolactone, ethylene carbamate, N-methyl-2-pyrrolidone, etc. These viscous solutions containing from 10 to 30 per cent by weight of the polymer can be extruded through an orifice into a coagulating bath containing a liquid, such as water, alcohol, etc., which is a non-solvent for the polymer. The resulting filaments can be stretched or drafted from 100 to 1400 per cent, dried, relaxed, and extruded to give yarns having the properties mentioned above.

The following examples will serve to illustrate further the manner in which I prepare the interpolymers of my invention.

*Example 1.—Interpolymer of α-acetoxyacrylonitrile and styrene*

10.8 g. of α-acetoxyacrylonitrile, 10.4 g. of styrene and 0.02 g. of benzoyl peroxide were placed in a sealed tube under an atmosphere of nitrogen, and polymerized at 50° C. When the polymerization was complete, the yellowish solid was removed, dissolved in acetone and precipitated in water.

*Example 2.—Interpolymer of α-acetoxyacrylonitrile and acrylonitrile*

10.8 g. of α-acetoxyacrylonitrile, 5.3 g. of acrylonitrile, and 0.005 g. of benzoyl peroxide were heated at 40° C. until polymerization was complete. A yellowish polymer which was insoluble in acetone was obtained.

*Example 3.—Interpolymer of α-acetoxyacrylonitrile and methyl α-methacrylate*

10.8 g. of acetoxyacrylonitrile, 10.0 g. of methyl α-methacrylate, and 0.01 g. of benzoyl peroxide were placed in a sealed tube under an atmosphere of nitrogen, and polymerized at 40° C. A yellowish copolymer which is soluble in acetone was obtained. This copolymer was found to be particularly valuable for molding, coating into films, and the like.

By substituting methyl acrylate, ethyl α-methacrylate, n-butyl α-methacrylate, or n-butyl acrylate in molecularly equivalent amounts in the above example, other copolymers can be prepared. Likewise, α-n-butyroxyacrylonitrile or α-isobutyroxyacrylonitrile can replace α-acetoxyacrylonitrile in the above example.

*Example 4.—Interpolymer of α-acetoxyacrylonitrile and isopropenyl acetate*

10.8 g. of α-acetoxyacrylonitrile, 25.0 g. of isopropenyl acetate, and 0.5 g. of benzoyl peroxide were placed in a sealed tube under an atmosphere of nitrogen and polymerized at 80° C. The resulting yellowish-solid was dissolved in acetone, and then precipitated by pouring into water. The yellowish-white solid thus obtained was found to be suitable for molding, coating to form films, etc.

*Example 5.—Interpolymer of α-propionoxyacrylonitrile, styrene, and acrylonitrile*

10.0 g. of α-propionoxyacrylonitrile, 10.0 g. of styrene, 10.0 g. of acrylonitrile, and 0.02 g. of benzoyl peroxide were placed in a sealed-glass tube under an atmosphere of nitrogen and polymerized at 50° C. When the polymerization was complete, the yellowish solid was removed, dissolved in acetone, and precipitated in water.

In another run, identical to that of the above example, the polymerization was stopped when only 20 to 30 per cent complete, and further polymerization inhibited by the addition of phenyl α-naphthylamine to the reaction product. The product was then poured into water, dissolved in acetone, and reprecipitated in water. When an acetone dope of this partially polymerized product was prepared, it was found to be suitable for spinning into fibers.

Several batches comprising a mixture of α-acetoxy-acrylonitrile and styrene were heated together in the presence of benzoyl peroxide (polymerization catalyst). The products were dissolved in acetone and precipitated in water as described in Example 1 above. The amounts (by weight) of α-acetoxyacrylonitrile, styrene, and benzoyl peroxide (except for Example 11 where none was used), time of heating, temperature, per cent of yield of polymer, and the appearance of the polymer products for each batch are given in the table below.

*Table I.—Interpolymers of α-acetoxyacrylonitrile and styrene*

| Example No. | Monomer Mixture | | Cat. Percent [1] | Time Days | Temp., °C. | Yield, Percent | Appearance |
|---|---|---|---|---|---|---|---|
| | Percent AAN | Percent Styrene | | | | | |
| 6 | 9 | 91 | 0.05 | 5 | 50 | 25 | White, horny solid. |
| 7 | 21 | 79 | 0.05 | 5 | 50 | 50 | White, fibrous and rubbery. |
| 8 | 26 | 74 | 0.05 | 5 | 50 | 50 | White, fibrous. |
| 9 | 35 | 65 | 0.05 | 5 | 50 | 55 | Curdy, white solid. |
| 10 | 54 | 46 | 0.1 | 4 | 50 | 80 | White, fibrous. |
| 11 | 54 | 46 | none | 5 | 50 | 20 | White, powder. |
| 12 | 68 | 32 | 0.05 | 5 | 50 | 35 | Do. |
| 13 | 77 | 23 | 0.05 | 5 | 50 | 25 | Do. |
| 14 | 81 | 19 | 0.05 | 5 | 50 | 24 | Do. |
| 15 | 84 | 16 | 0.05 | 5 | 50 | 27 | Do. |

AAN=α-acetoxyacrylonitrile.
[1] =amount of catalyst based on combined weight of monomers.

Separate matches comprising 53 parts by weight of α-acetoxyacrylonitrile and 47 parts by weight of methyl-α-methacrylate were heated at 50° C. in the presence of benzoyl peroxide and the polymer products dissolved in acetone and precipitated in water. The amounts of catalyst (based on combined weights of monomers), time of heating, yield and appearance of the polymers are given in the table below.

Table II.—Interpolymers of α-acetoxyacrylonitrile and methyl α-methacrylate

| Example No. | Cat., Percent | Time, Days | Yield, Percent | Appearance |
|---|---|---|---|---|
| 16 | 0.05 | 5 | 65 | White, fibrous. |
| 17 | 0.1 | 6 | 70 | Do. |
| 18 | 0.1 | 4 | 75 | Do. |

15 g. portions of a monomeric mixture consisting of acrylonitrile and α-acetoxyacrylonitrile were dissolved in separate flasks containing 22.5 cc. of a solvent mixture of N,N-dimethylformamide and acetic acid (50/50 by volume) and 0.015 g. of benzoyl peroxide added to each of the flasks. The flasks were then heated at 60° C. for 48–72 hours until complete polymerization was assured, and the polymer precipitated, filtered, washed with water, and dried. The composition of the monomeric mixture, yield of polymer, per cent of α-acetoxyacrylonitrile in the polymer, per cent carbon in the polymer, and intrinsic viscosity of a solution of the polymer in pure N,N-dimethylformamide are given in the table below.

| Example No. | Monomer Mixture | | Yield, Percent | Polymer | | Intrinsic Viscosity |
|---|---|---|---|---|---|---|
| | Percent AAN | Percent AN | | Percent AAN | Percent C | |
| 19 | 5 | 95 | 81.3 | 6.5 | 67 | 3.26 |
| 20 | 10 | 90 | 70.6 | 15.3 | 65.8 | 3.06 |
| 21 | 15 | 85 | 62 | 19.5 | 65.2 | 2.68 |
| 22 | 20 | 80 | 75.4 | 23.1 | 64.7 | 1.67 |
| 23 | 25 | 75 | 70 | 30.4 | 63.7 | 12.5 |

The new interpolymers of my invention can be used in the preparation of synthetic fibers as mentioned above, and also in the preparation of films, molded articles, sheets, tubes, etc. The interpolymers containing the alkyl acrylates or methacrylates have been found to be especially useful for the preparation of molded products.

What I claim as my invention and desire secured by Letters Patent of the United States is:

1. A resinous interpolymer comprising from 5 to 95 per cent by weight of an α-acyloxyacrylonitrile selected from those represented by the following general formula:

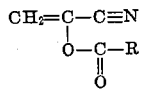

wherein R represents an alkyl group of from 1 to 3 carbon atoms, and from 95 to 5 per cent by weight of a monomer selected from the group consisting of styrene, isopropenyl acetate, acrylonitrile, alkyl acrylates containing from 1 to 4 carbon atoms in the alkyl group, and alkyl α-methacrylates containing from 1 to 4 carbon atoms in the alkyl group.

2. A resinous interpolymer comprising from 5 to 95 per cent by weight of α-acetoxyacrylonitrile and from 95 to 5 per cent by weight of acrylonitrile.

3. A resinous interpolymer comprising from 5 to 30 per cent by weight of α-acetoxyacrylonitrile and from 95 to 70 per cent by weight of acrylonitrile.

4. A resinous interpolymer comprising from 5 to 95 per cent by weight of α-acetoxyacrylonitrile and from 95 to 5 per cent by weight of styrene.

5. A resinous interpolymer comprising from 5 to 95 per cent by weight of α-acetoxyacrylonitrile and from 95 to 5 per cent by weight of isopropenyl acetate.

6. A resinous interpolymer comprising from 5 to 95 per cent by weight of α-acetoxyacrylonitrile and from 95 to 5 per cent by weight of an alkyl acrylate containing from 1 to 4 carbon atoms in the alkyl group.

7. A resinous interpolymer comprising from 5 to 95 per cent by weight of α-acetoxyacrylonitrile and from 95 to 5 per cent by weight of an alkyl α-methacrylate containing from 1 to 4 carbon atoms in the alkyl group.

8. A resinous interpolymer comprising from 5 to 95 per cent by weight of α-acetoxyacrylonitrile and from 95 to 5 per cent by weight of methyl α-methacrylate.

9. A process for preparing resinous interpolymers comprising heating in the presence of a peroxide polymerization catalyst from 5 to 95 parts by weight of an α-acyloxyacrylonitrile selected from those represented by the following general formula:

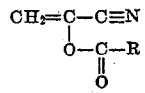

wherein R represents an alkyl group of from 1 to 3 carbon atoms, and from 95 to 5 parts by weight of a monomer selected from the group consisting of styrene, isopropenyl acetate, acryonitrile, alkyl acrylates containing from 1 to 4 carbon atoms in the alkyl group, and alkyl α-methacrylates containing from 1 to 4 carbon atoms in the alkyl group.

10. A process for preparing a resinous interpolymer comprising heating in the presence of a peroxide polymerization catalyst from 5 to 95 parts by weight of α-acetoxyacrylonitrile and from 95 to 5 parts by weight of acrylonitrile.

11. A process for preparing a resinous interpolymer comprising heating in the presence of a peroxide polymerization catalyst from 5 to 25 parts by weight of α-acetoxyacrylonitrile and from 95 to 75 parts by weight of acrylonitrile.

12. A process for preparing a resinous interpolymer comprising heating in the presence of a peroxide polymerization catalyst from 5 to 95 parts by weight of α-acetoxyacrylonitrile and from 95 to 5 parts by weight of styrene.

13. A process for preparing a resinous interpolymer comprising heating in the presence of a peroxide polymerization catalyst from 5 to 95 parts by weight of α-acetoxyacrylonitrile and from 95 to 5 parts by weight of isopropenyl acetate.

14. A process for preparing a resinous interpolymer comprising heating in the presence of a peroxide polymerization catalyst from 5 to 95 parts by weight of α-acetoxyacrylonitrile and from 95 to 5 parts by weight of an alkyl acrylate containing from 1 to 4 carbon atoms in the alkyl group.

15. A process for preparing a resinous interpolymer comprising heating in the presence of a peroxide polymerization catalyst from 5 to 95 parts by weight of α-acetoxyacrylonitrile and from 95 to 5 parts by weight of an alkyl α-methacrylate containing from 1 to 4 carbon atoms in the alkyl group.

16. A process for preparing a resinous interpolymer comprising heating in the presence of a peroxide polymerization catalyst from 5 to 95 parts by weight of α-acetoxyacrylonitrile and from 95 to 5 parts by weight of methyl α-methacrylate.

JOSEPH B. DICKEY.

REFERENCES CITED

The following references are of record in the file of this patent:

UNITED STATES PATENTS

| Number | Name | Date |
|---|---|---|
| 2,395,930 | Johnston et al. | Mar. 5, 1946 |
| 2,453,824 | Wood | Nov. 16, 1948 |
| 2,464,120 | Dickey et al. | Mar. 8, 1949 |
| 2,469,836 | Milone | May 10, 1949 |
| 2,472,811 | Dickey | June 14, 1949 |
| 2,475,423 | Dickey | July 5, 1949 |
| 2,537,881 | Dickey | Jan. 9, 1951 |